US012736414B2

(12) United States Patent
Clarkson et al.

(10) Patent No.: US 12,736,414 B2
(45) Date of Patent: Sep. 15, 2026

(54) RELATING TO THERMOCOUPLES FOR TUBULAR REACTORS

(71) Applicant: JOHNSON MATTHEY DAVY TECHNOLOGIES LIMITED, London (GB)

(72) Inventors: Jay Simon Clarkson, Stockton-on-Tees (GB); Henry Arthur Claxton, London (GB); Andrew Lewis Dyer, London (GB); Benjamin Geoffrey Mallam, Stockton-on-Tees (GB)

(73) Assignee: Johnson Matthey Davy Technologies Limited, London (GB)

( * ) Notice: Subject to any disclaimer, the term of this patent is extended or adjusted under 35 U.S.C. 154(b) by 454 days.

(21) Appl. No.: 18/040,370

(22) PCT Filed: Sep. 24, 2021

(86) PCT No.: PCT/GB2021/052489
§ 371 (c)(1),
(2) Date: Feb. 2, 2023

(87) PCT Pub. No.: WO2022/064210
PCT Pub. Date: Mar. 31, 2022

(65) Prior Publication Data

US 2023/0271151 A1 Aug. 31, 2023

(30) Foreign Application Priority Data

Sep. 25, 2020 (GB) ..................................... 2015181

(51) Int. Cl.
*G01K 7/02* (2021.01)
*B01J 8/02* (2006.01)
*B01J 8/06* (2006.01)
*G01K 1/14* (2021.01)

(52) U.S. Cl.
CPC .............. *G01K 7/02* (2013.01); *B01J 8/0285* (2013.01); *B01J 8/067* (2013.01); *G01K 1/146* (2013.01); *B01J 2208/00061* (2013.01)

(58) Field of Classification Search
None
See application file for complete search history.

(56) References Cited

U.S. PATENT DOCUMENTS 2,369,478 A * 2/1945 Mekler .................. B01J 8/0257 422/642
2,646,681 A * 7/1953 Walton .................. G05D 23/22 374/111
3,263,502 A * 8/1966 Springfield .............. G01K 1/14 136/224

(Continued)

FOREIGN PATENT DOCUMENTS

CL 202300711 A1 10/2023
CL 202300725 A1 10/2023

(Continued)

*Primary Examiner* — Jennifer A Leung
(74) *Attorney, Agent, or Firm* — BakerHostetler

(57) ABSTRACT

A method of installing a thermocouple in a reactor tube of a tubular reactor, comprising lowering a weighted tow line through a stack of catalyst carriers and using a tow line to pull the thermocouple down the reactor tube through inner channels of the stack of catalyst carriers into a desired installation position.

8 Claims, 7 Drawing Sheets

(56) References Cited

U.S. PATENT DOCUMENTS

| | | | | |
|---|---|---|---|---|
| 3,637,438 | A * | 1/1972 | Springfield | G01K 1/14 374/E1.018 |
| 2006/0284723 | A1 * | 12/2006 | Ha | G01K 3/14 374/E7.004 |
| 2007/0116090 | A1 * | 5/2007 | Park | G01K 13/10 374/208 |
| 2009/0163748 | A1 | 6/2009 | Bank et al. | |
| 2012/0125479 | A1 | 5/2012 | Brightling et al. | |
| 2016/0325254 | A1 * | 11/2016 | Gray | B01J 8/0415 |
| 2020/0240260 | A1 | 7/2020 | Melnychuk | |
| 2023/0264160 | A1 | 8/2023 | Claxton et al. | |
| 2023/0285917 | A1 | 9/2023 | Baker et al. | |
| 2023/0294056 | A1 | 9/2023 | Clarkson et al. | |
| 2023/0294058 | A1 | 9/2023 | Clarkson et al. | |

FOREIGN PATENT DOCUMENTS

| | | | |
|---|---|---|---|
| CL | 202300744 | A1 | 10/2023 |
| CL | 202300746 | A1 | 11/2023 |
| CN | 207779586 | U | 8/2018 |
| CN | 108871601 | A | 11/2018 |
| CN | 210221333 | U | 3/2020 |
| EP | 1 487 578 | B1 | 5/2015 |
| GB | 2524865 | A | 10/2015 |
| JP | H07128152 | A | 5/1995 |
| WO | 00/17946 | A2 | 3/2000 |
| WO | 2008/151139 | A1 | 12/2008 |
| WO | 2011/012875 | A1 | 2/2011 |
| WO | 2011/048361 | A1 | 4/2011 |
| WO | 2012/136971 | A1 | 10/2012 |
| WO | 2015/114345 | A1 | 8/2015 |
| WO | 2016/050520 | A1 | 4/2016 |
| WO | 2022/064210 | A2 | 3/2022 |

* cited by examiner

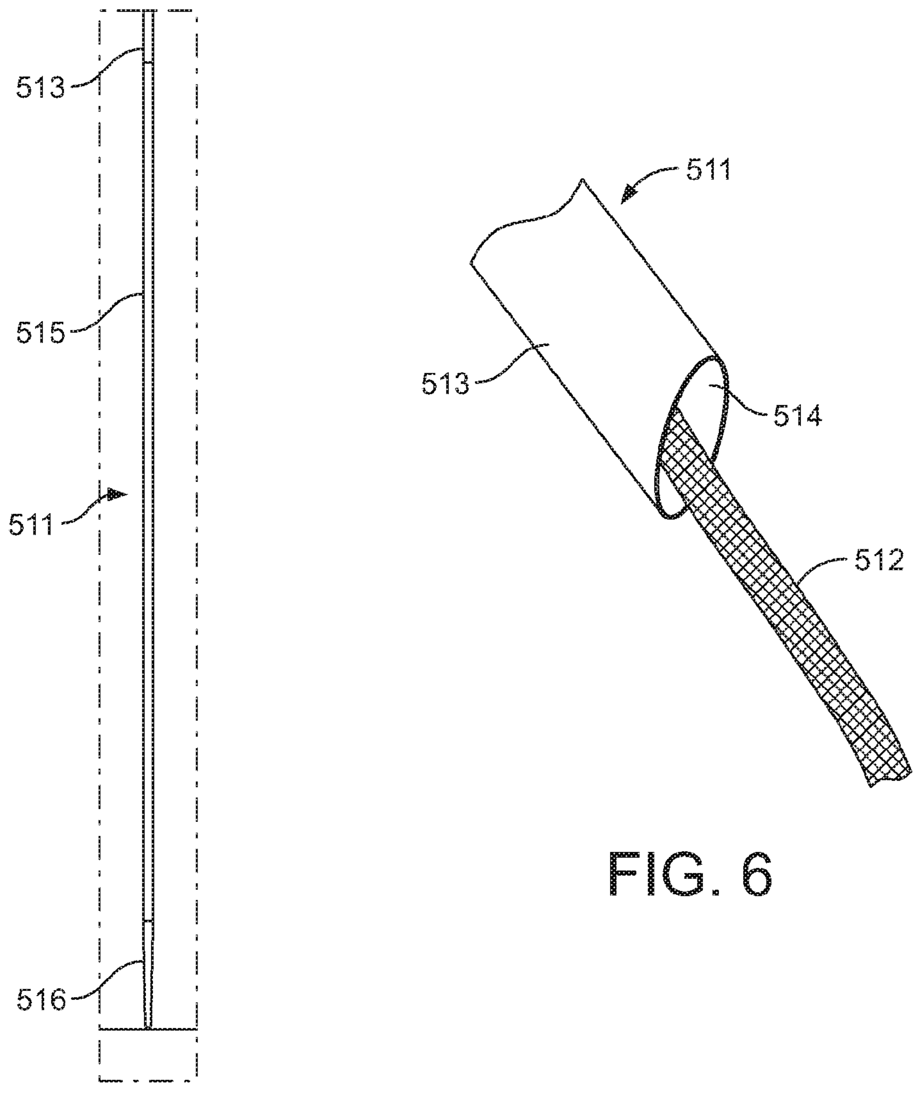
FIG. 5
FIG. 6
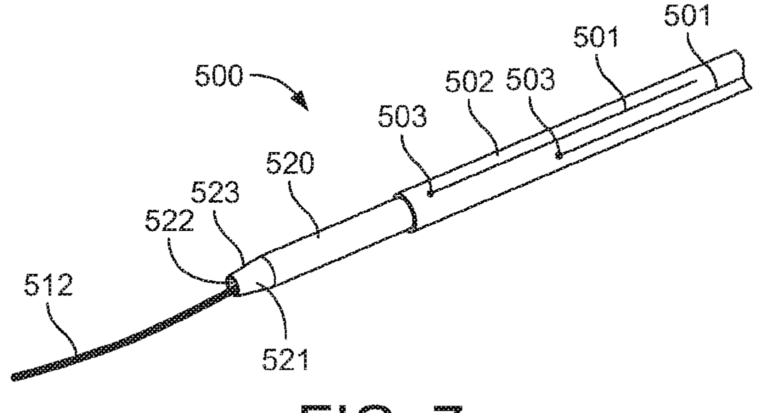
FIG. 7

RELATING TO THERMOCOUPLES FOR TUBULAR REACTORS

The present disclosure relates to improvements in or relating to thermocouples for tubular reactors. In particular to a method of installing a thermocouple in a reactor tube of a tubular reactor and associated parts, methods and assemblies.

BACKGROUND

Conventional, so-called fixed-bed tubular, reactors comprise a reactor shell containing a plurality of tubes, which are usually cylindrical, and which are usually directly filled with catalyst particles. In use, a heat-transfer medium flows through the shell of the reactor outside these tubes and thereby adjusts the temperature of the catalyst in the tubes by heat exchange across the tube wall. Thus, where the reaction is an exothermic reaction, the heat-transfer medium will allow heat to be removed from the catalyst and where the reaction is an endothermic reaction, the heat-transfer medium will provide heat to the catalyst.

For some reactions, the heat effects of the reaction are moderate such that they are either not problematic or they can be readily managed. In some cases, the heat effects are sufficiently small that large-diameter tubes may be used. This has the benefit that there is a large volume of catalyst within the tube.

However, for more exothermic or endothermic reactions it is necessary that there is efficient heat transfer via the tube wall to the heat-transfer medium to enable the conditions within the reactor to be controlled in order to maintain a stable operating temperature to avoid detrimental effects occurring. Such effects, for exothermic reactions, may include side reactions taking place, damage to the catalyst such as by sintering of the catalytic active sites, and, in a worst case, thermal runaway. Detrimental effects for endothermic reactions may include quenching of the reaction.

To achieve the desired efficiency, the surface area of the tube wall per unit length has to be maximised. This has, in the past, been achieved by installing a greater number of smaller-diameter tubes. In some reactions, the size restriction means that the tubes are only of the order of about 15 to 40 mm internal diameter. However, the use of this multiplicity of tubes increases the cost and complexity of the reactor.

Thus, in an attempt to mitigate these problems an alternative approach has been developed, in particular for more exothermic or endothermic reactions, in which the catalyst is not directly packed into the reactor tubes but is instead contained in a plurality of catalyst carriers that are configured to sit within the reactor tube.

A first type of such a catalyst carrier is described in WO2011/048361. This arrangement seeks to optimise heat transfer at the tube wall such that larger tubes and larger volumes of smaller catalyst particles can be used, even for more exothermic or endothermic reactions. The catalyst carrier described in WO2011/048361 comprises an annular container for holding catalyst in use. The container has a perforated inner wall defining a tube, a perforated outer wall, a top surface closing the annular container and a bottom surface closing the annular container. The surface closing the bottom of the tube is formed by the inner wall of the annular container. A skirt extends upwards from the perforated outer wall of the annular container from a position at or near the bottom surface of the container to a position below the location of a seal. A seal is located at or near the top surface and extends from the container by a distance which extends beyond an outer surface of the skirt.

A second type of such a catalyst carrier is described in WO2012/136971. In this arrangement, the catalyst carrier comprises a container for holding a monolith catalyst in use, said container having a bottom surface closing the container and a skirt extending upwardly from the bottom surface of said container to a position below the location of a seal and spaced therefrom, said skirt being positioned such that there is a space between an outer surface of the monolith catalyst and the skirt; and a seal located at or near a top surface of the monolith catalyst and extending from the monolith catalyst by a distance which extends beyond an outer surface of the skirt.

A third type of such a catalyst carrier is described in WO2016/050520. In this arrangement, the catalyst carrier comprises a container for holding catalyst in use. The container has a bottom surface closing the container and a top surface. A carrier outer wall extends from the bottom surface to the top surface and a seal extends from the container by a distance which extends beyond the carrier outer wall. The carrier outer wall has apertures located below the seal.

It can be important to monitor the temperatures within the reactor tubes in order to monitor the operation of the tubular reactor. GB2524865A describes the use of a multipoint thermocouple which may be arranged down the centre of a plurality of catalyst carriers within a reactor tube when the flow of reactant gas is in a 'reverse direction', that is from the bottom of the reactor tube to the top of the reactor tube.

However, arranging thermocouples in reactor tubes can be difficult and time-consuming. An individual reactor tube may comprise up to 60 or more catalyst carriers which may make installing a thermocouple particularly awkward. The cost of reactor downtime is significant. Therefore, it would be desirable to provide an improved method for installing a thermocouple in a reactor tube of a tubular reactor.

In addition, locating a thermocouple in a reactor tube may cause a disturbance to the gas and/or liquid flow of reactants and products within the reactor tube. Therefore, it would be desirable to provide an improved method that at least partially ameliorates such disturbances.

SUMMARY OF THE DISCLOSURE

In a first aspect of the present disclosure there is provided a method of installing a thermocouple in a reactor tube of a tubular reactor, the method comprising the steps of:

i) providing a stack of catalyst carriers within the reactor tube of the tubular reactor, each catalyst carrier comprising an inner channel that extends from a top to a bottom of the catalyst carrier;
ii) providing a weighted tow line comprising a weight and a tow line that trails from the weight;
iii) inserting the weight into a top of the reactor tube and into the inner channel of an uppermost catalyst carrier of the stack;
iv) lowering the weighted tow line under gravity through the inner channel of the uppermost catalyst carrier and thereafter through the inner channels of each of the remaining catalyst carriers of the stack until the weighted tow line emerges from a bottom of the reactor tube;
v) attaching a thermocouple to a trailing end of the tow line;

vi) engaging the thermocouple into the top of the reactor tube within the inner channel of the uppermost catalyst carrier of the stack; and vii) pulling on the tow line from below the reactor tube to pull the thermocouple down the reactor tube through the inner channels of the stack of catalyst carriers into a desired installation position of the thermocouple.

In a second aspect of the present disclosure there is provided a thermocouple comprising one or more thermocouple assemblies, an outer sheath covering the one or more thermocouple assemblies and a tip portion configured for attachment to a tow line.

In a third aspect of the present disclosure there is provided a kit of parts for installing a thermocouple in a reactor tube of a tubular reactor, the kit of parts comprising:

a) a thermocouple comprising one or more thermocouple assemblies, an outer sheath covering the one or more thermocouple assemblies and a tip portion; and b) a weighted tow line comprising a weight and a tow line that trails from the weight.

Advantageously, by use of the weighted tow line, the ease and speed of installation of the thermocouple in the reactor tube may be improved, leading to a reduction in downtime of the tubular reactor.

In step iv) of the first aspect the weighted tow line may pass through a drain hole of each of the catalyst carriers. The drain holes of the catalyst carriers may be sized to simultaneously function as a conduit for the thermocouple and a drain for the stack of catalyst carriers. In some examples the drain holes each have an inner diameter of 3.0 to 10.0 mm; optionally 5.0 to 6.5 mm; optionally 5.2 to 5.8 mm. Beneficially the use of the drain hole to conduct the thermocouple avoids the need to provide any additional aperture in the catalyst carrier. Thus, disturbances in the gas and liquid flow through the catalyst carrier may be minimised. Additionally, the sizing of the drain hole may be such that the drain hole may continue to function effectively as a drain for the catalyst carrier at the same time as providing a passage for the thermocouple. Again, disturbances in the gas and liquid flow through the catalyst carrier may therefore be minimised.

The drain holes of the catalyst carriers may be aligned on the same axis. The axis may be a vertical axis and may be coincident with a central longitudinal axis of the reactor tube.

The weight may be configured to have a length greater than a length of one catalyst carrier, optionally greater than a length of two catalyst carriers, optionally greater than a length of three catalyst carriers. In step iii) of the first aspect the weight may be inserted into the inner channel of the uppermost one, optionally uppermost two, optionally uppermost three catalyst carriers. Beneficially this may allow easier alignment of the weighted tow line with the inner channels of the catalyst carrier. In addition, the chances of the weighted tow line deflecting off a centre line of the tubular reactor so as to snag on a surface of the catalyst carrier may be much reduced. The weight may be suitably fabricated from a dense material, typically a metal such as steel, so that it is heavy enough to draw the tow line through the catalyst carriers.

The tow line may be any flexible wire or cable. The tow line may be fabricated from any suitable material that has the necessary strength to support the weight and when under tension to pull the thermocouple through the catalyst carriers without breaking. For example, the tow wire may be a steel wire.

The thermocouple may be configured to have a tip portion to aid insertion. The tip portion may have a length greater than a length of one catalyst carrier, optionally greater than a length of two catalyst carriers, optionally greater than a length of three catalyst carriers. In step vi) of the first aspect, the tip portion of the thermocouple may be fed into the inner channel of the uppermost one, optionally uppermost two, optionally uppermost three catalyst carriers.

The tip portion may comprise a solid member or a hollow tubular member or a mixture thereof. The tip portion may be formed from a metal such as carbon steel, aluminium, stainless steel, or other suitable alloys able to withstand the reaction conditions.

The tip portion may extend distally from a distal end of the thermocouple, for example from the one or more thermocouple assemblies.

The tip portion may be rigid.

The tip portion may comprise a tapered tip and a straight section.

The thermocouple may be attached to the trailing end of the tow line by joining the trailing end to the tip portion of the thermocouple.

The tip portion may comprise a tubular part and the trailing end of the tow line may be attached into the tubular part. The tow line may be attached by any suitable means, including but not limited to an adhesive, soldering, welding, crimping/flattening of the tubular part, plugging of the tubular part with a plug to trap the trailing end, etc.

In step vii) of the first aspect the method may further comprise attaching the tow line to a winding device and pulling on the tow line by winding the winding device. The winding device may be a powered or hand-operated winding device.

In step v) of the first aspect the thermocouple may be attached to the trailing end of the tow line before the weighted tow line in inserted into the reactor tube or after the weighted tow line emerges from the bottom of the reactor tube.

After the weighted tow line emerges from the bottom of the reactor tube the weight may be detached from the tow line. The weight may be detached, for example, by cutting the tow line.

After the thermocouple reaches its desired installation position the tow line may be detached from the thermocouple. The tow line may be detached from the thermocouple, for example, by cutting the tow line.

The kit of parts may further comprise a winding device for winding the tow line.

The kit of parts may further comprise a plurality of catalyst carriers, wherein each catalyst carrier may comprise an inner channel that extends from a top to a bottom of the catalyst carrier.

Each catalyst carrier may comprise a drain hole at a bottom of the catalyst carrier which may be sized to accommodate passage of the weight, the tow line and the thermocouple.

The drain hole may be located on a central axis of the inner channel of each catalyst carrier.

The inner channel of each catalyst carrier may comprise a funnel portion for guiding the weight and the thermocouple towards the drain hole.

In a fourth aspect of the present disclosure there is provided an assembly of a tubular reactor, catalyst carriers and a plurality of multipoint thermocouples;

the tubular reactor comprising a plurality of reactor tubes;

each of the plurality of reactor tubes containing a plurality of catalyst carriers;

a first reactor tube of the plurality of reactor tubes additionally comprising a first multipoint thermocouple threaded through an interior of the catalyst carriers contained within the first reactor tube;

wherein a second reactor tube of the plurality of reactor tubes additionally comprising a second multipoint thermocouple threaded through an interior of the catalyst carriers contained within the second reactor tube;

wherein temperature sensors of the first multipoint thermocouple are arranged to read temperatures within a first portion of the length of the tubular reactor and temperature sensors of the second multipoint thermocouple are arranged to read temperatures within a second portion of the length of the tubular reactor.

The first portion and the second portion may not overlap, or may not significantly overlap. For example, the first portion may be an upper 50% to 60% of the length of the reactor tube and the second portion may be a lower 50% to 60% of the length of the reactor tube.

The assembly may further comprise a third reactor tube of the plurality of reactor tubes additionally comprising a third multipoint thermocouple threaded through an interior of the catalyst carriers contained within the third reactor tube;

wherein temperature sensors of the third multipoint thermocouple are arranged to read temperatures within a third portion of the length of the tubular reactor.

The first portion, second portion and third portion may not overlap, or may not significantly overlap. For example, the first portion may be an upper 33% to 40% of the length of the reactor tube, the second portion may be a middle 33% to 40% of the length of the reactor tube and the third portion may be a lower 33% to 40% of the length of the reactor tube.

Each of the catalyst carriers in the reactor tubes that do not contain a multipoint thermocouple may comprise a drain hole of a first inner diameter and each of the catalyst carriers in the reactor tubes that do contain a multipoint thermocouple may comprise a drain hole of a second inner diameter that is greater than the first diameter.

For example, the first diameter may be 2.5 to 3.5 mm, optionally 3.0 mm and the second diameter may be 3.0 to 10.0 mm; optionally 5.0 to 6.5 mm; optionally 5.2 to 5.8 mm.

In a fifth aspect of the present disclosure there is provided an assembly of a tubular reactor, catalyst carriers and one or more thermocouples;

the tubular reactor comprising a plurality of reactor tubes;

each of the plurality of reactor tubes containing a plurality of catalyst carriers;

a selected one or more reactor tubes of the plurality of reactor tubes additionally comprising a thermocouple threaded through an interior of the catalyst carriers contained within the reactor tube;

wherein each of the catalyst carriers in the reactor tubes that do not contain a thermocouple comprises a drain hole of a first inner diameter and each of the catalyst carriers in the reactor tubes that do contain a thermocouple comprises a drain hole of a second inner diameter that is greater than the first diameter.

The first diameter may be 2.5 to 3.5 mm, optionally 3.0 mm and the second diameter may be 3.0 to 10.0 mm; optionally 5.0 to 6.5 mm; optionally 5.2 to 5.8 mm; optionally 5.6 mm.

The present methods and associated parts and assemblies may usefully be used for a wide range of processes. Examples of suitable uses include processes and reactors for exothermic reactions such as reactions for the production of methanol, reactions for the production of ammonia, methanation reactions, shift reactions, oxidation reactions such as the formation of maleic anhydride and ethylene oxide reactions and the like. A particularly preferred use is in processes and reactors for performing the Fischer-Tropsch reaction.

Endothermic reactions such as pre-reforming, dehydrogenation and the like may also be carried out in conjunction with the present methods and associated parts and assemblies.

The catalyst carriers of the present disclosure may be filled or partially filled with any catalyst suitable for the intended reaction. For example, a Fischer-Tropsch catalyst may be used for the Fischer-Tropsch reaction. Cobalt-containing Fischer-Tropsch catalysts are preferred. The catalyst may be provided as catalyst particles or a catalyst monolith. The catalyst may be provided as a single bed of catalyst or multiple beds of catalyst. The catalyst carrier may be configured to promote axial and/or radial flow through the catalyst. In some embodiments the catalyst carrier may be configured to preferentially promote radial flow through the catalyst.

The catalyst carrier of the present disclosure may be formed of any suitable material. Such material will generally be selected to withstand the operating conditions of the tubular reactor. The catalyst carrier may be fabricated from carbon steel, aluminium, stainless steel, other alloys or any material able to withstand the reaction conditions.

BRIEF DESCRIPTION OF THE DRAWINGS

Embodiments of the present disclosure will now be described, by way of example only, with reference to the accompanying drawings, in which:

FIG. 5 is a side view of a weight of the weighted tow line of FIG. 4;

FIG. 6 is a perspective view of a portion of the assembly of FIG. 4 showing an attachment between the weight and a tow line;

FIG. 7 is a perspective view of a portion of the assembly of FIG. 4 showing an attachment between the tow line and the thermocouple;

DETAILED DESCRIPTION

Figure 1:
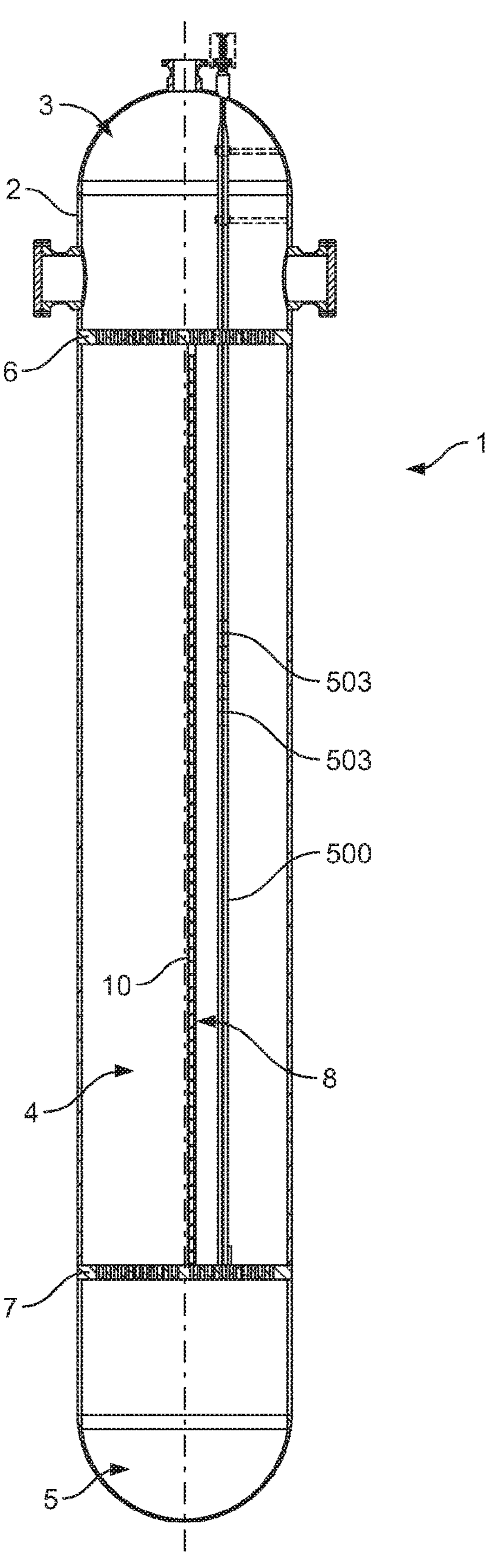
FIG. 1 is a schematic view of a tubular reactor.

In the following, aspects and embodiments of the present disclosure will be described, by way of example only, with reference to a vertically orientated tubular reactor having a plurality of vertical reactor tubes extending between an upper tube sheet and a lower tube sheet. However, it will be understood that the present disclosure may also be applied to other configurations of tubular reactor that may adopt other orientations.

Additionally, in this specification any reference to orientation, for example terms such as top, bottom, upper, lower, above, below and the like have, is used with regard to the orientation of the parts as illustrated in the drawings being referenced but is not to be seen as restrictive on the potential orientation of such parts in actual use.

FIG. 1 shows a typical layout of a tubular reactor 1 of the present disclosure. The tubular reactor 1 comprises a housing 2. The interior of the housing may be divided into a head space 3, a heat-exchange zone 4 and a footer space 5 by two tube sheets—an upper tube sheet 6 and a lower tube sheet 7. The upper tube sheet 6 separates the head space 3 from the heat-exchange zone 4. The lower tube sheet 7 separates the footer space 5 from the heat-exchange zone 4.

A plurality of reactor tubes 8 extend between the upper tube sheet 6 and the lower tube sheet 7. A large number of reactor tubes 8 may be provided, for example between 20 and 5000 reactor tubes 8 may be present. Each reactor tube 8 may have, for example, an internal diameter of between 20 and 150 mm. In some embodiments the internal diameter may be about 85 mm.

Figure 8:
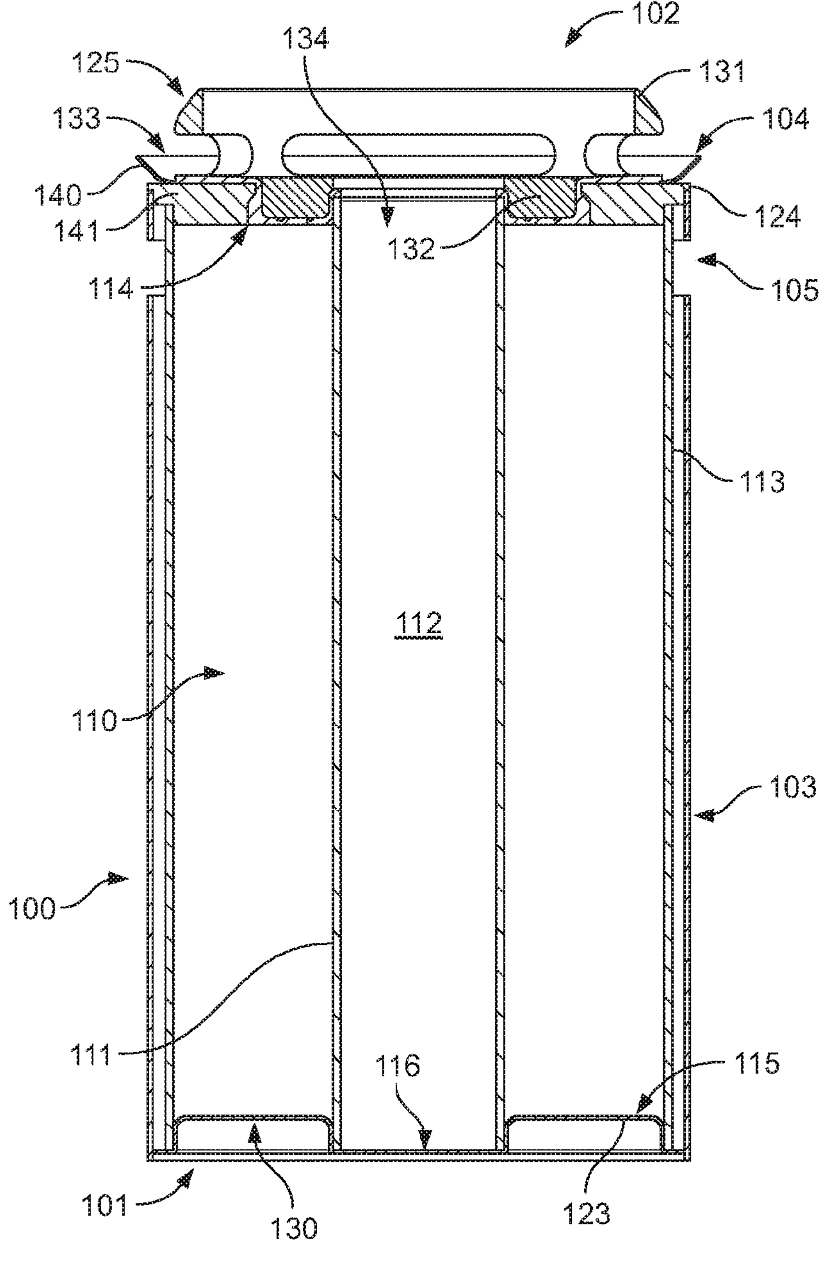
FIG. 8 is a cross-sectional view of a catalyst carrier.
Figure 9:
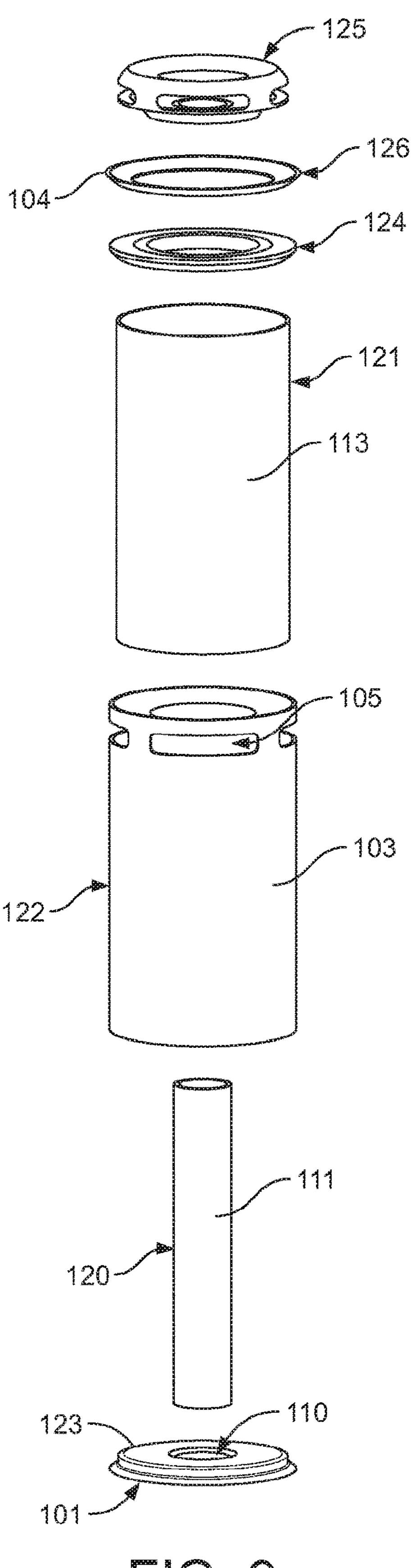
FIG. 9 is an exploded perspective view of the catalyst carrier of FIG. 8.
Figure 10:
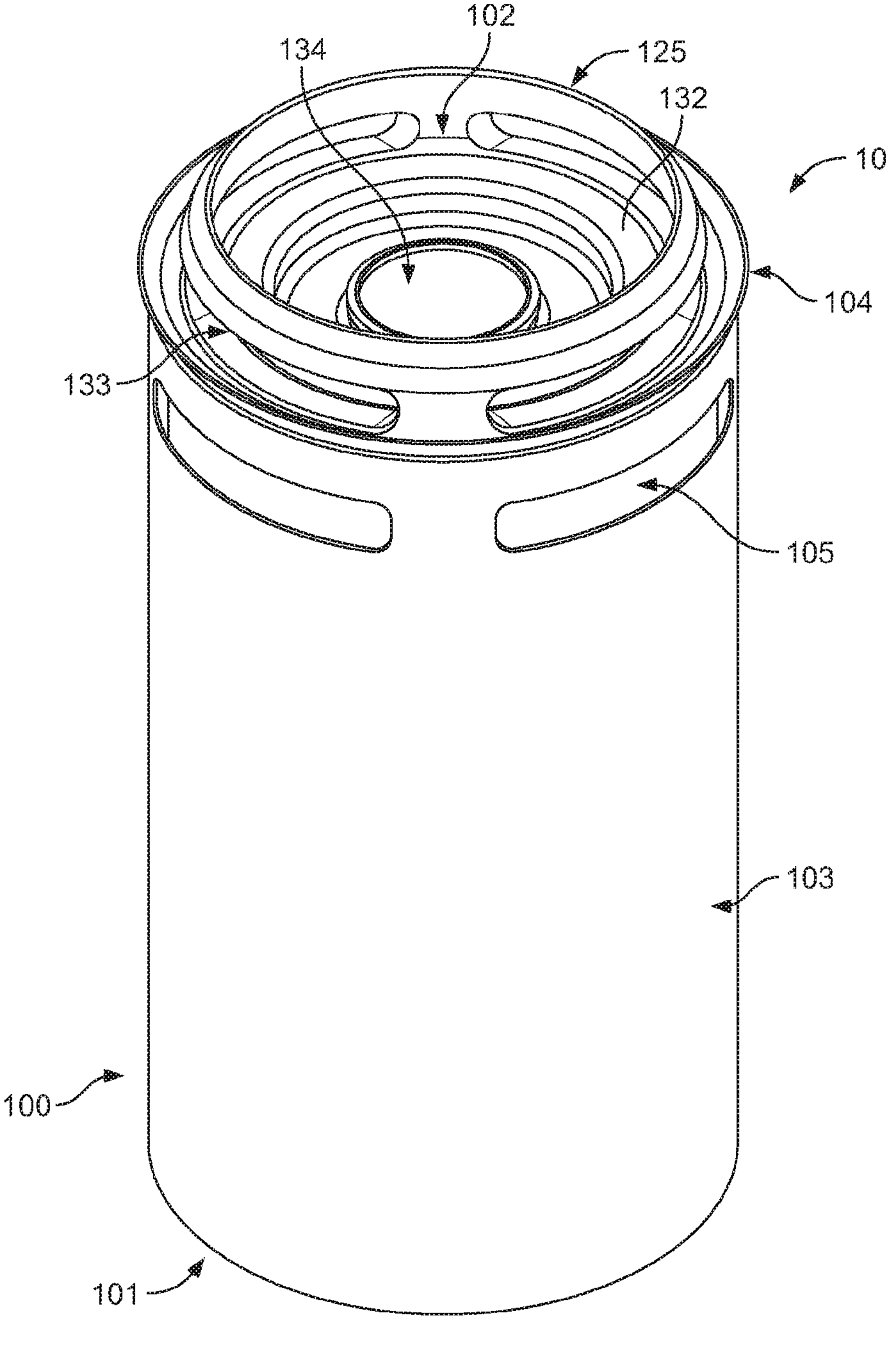
FIG. 10 is a perspective view of the catalyst carrier of FIG. 8.

Each reactor tube 8 is intended to be filled or substantially filled with a stacked arrangement of catalyst carriers 10. An example of a suitable catalyst carrier 10 is shown in FIGS. 8 to 10. In particular, it is typically desired that the catalyst carriers 10 cover all or substantially all of the length of the reactor tube 8 between the upper tube sheet 6 and the lower tube sheet 7, i.e. that they cover all or substantially all of the length of the heat-exchange zone 4. Each catalyst carrier 10 has an inner channel (not shown).

The head space 3 may provide access to an upper end of the reactor tubes 8 to allow loading of the catalyst carriers 10 into the reactor tubes 8. The footer space 5 may provide access to the lower end of the reactor tubes 8 to allow unloading of the catalyst carriers 10 from the reactor tubes 8.

Figure 2:
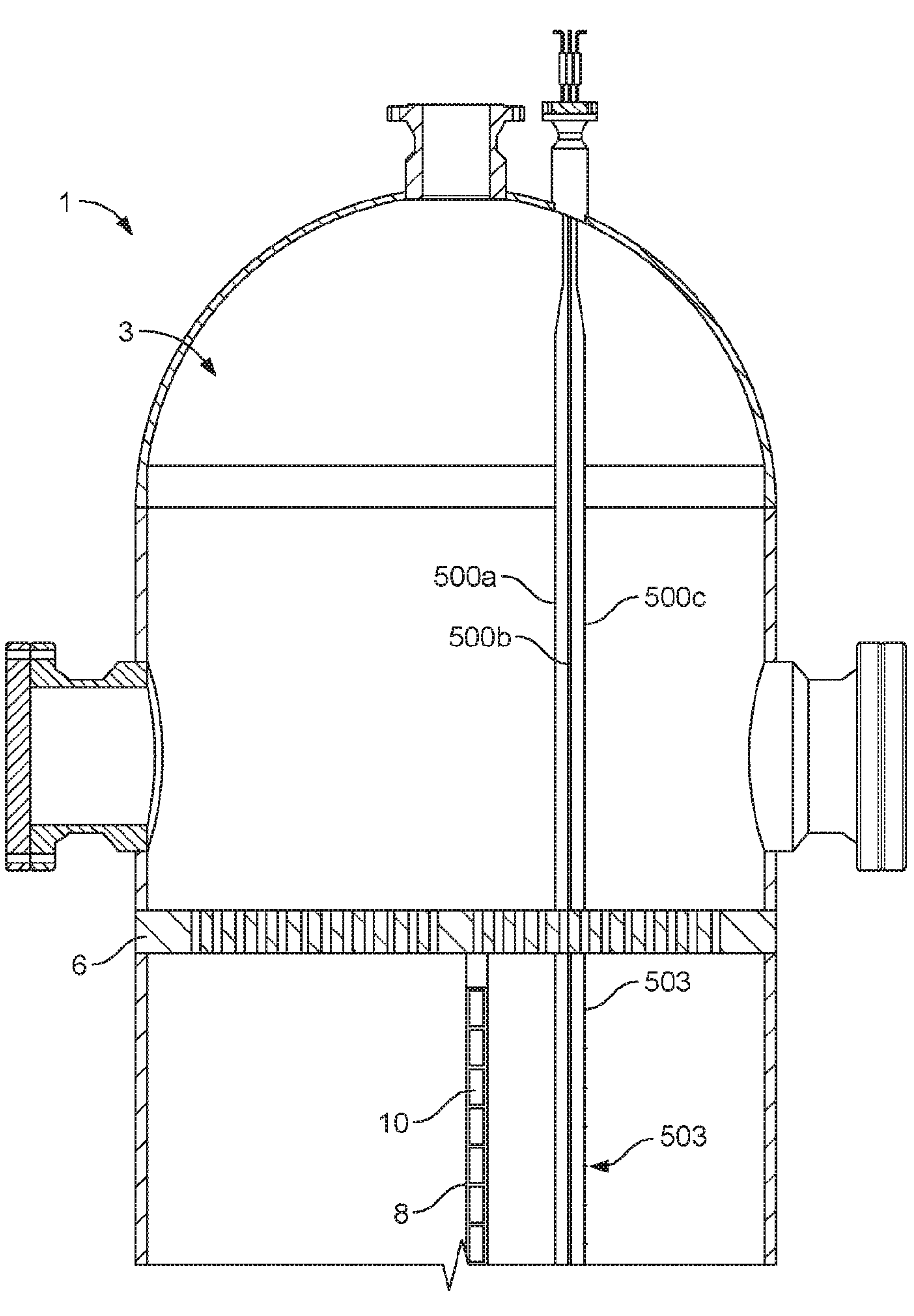
FIG. 2 is an enlarged portion of FIG. 1.
Figure 3:
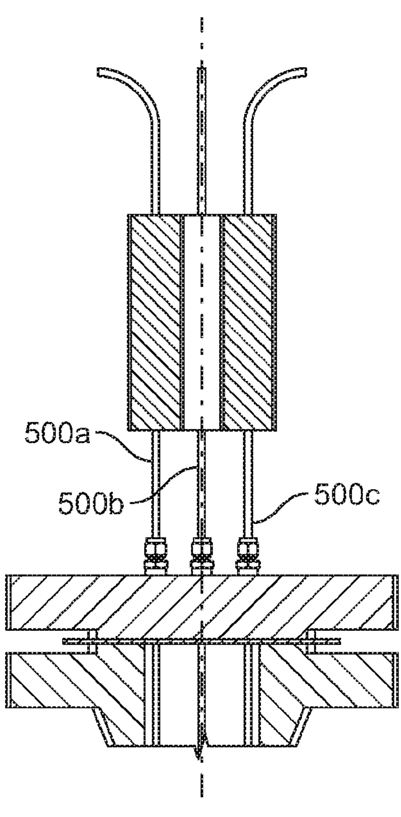
FIG. 3 is another enlarged portion of FIG. 1.

The tubular reactor 1 may be fitted with one or more thermocouples 500 as shown in FIGS. 1 to 3. Each thermocouple 500 may be a multipoint thermocouple. For example, each thermocouple 500 may comprise one or more thermocouple assemblies 501 and an outer sheath 502 covering the one or more thermocouple assemblies 501 as shown in FIG. 7. Each thermocouple assembly 501 may comprise at least one temperature sensing point 503.

Figure 4:
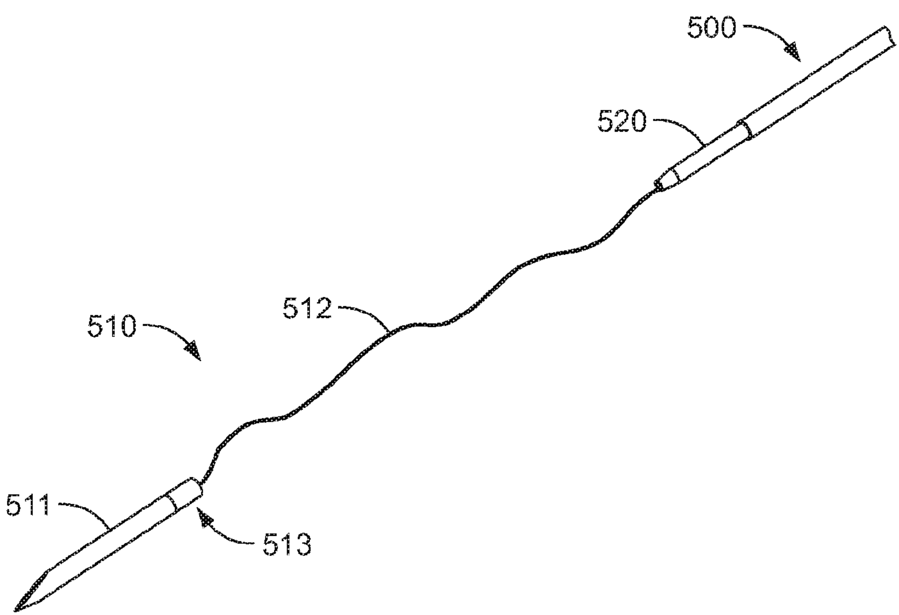
FIG. 4 is a schematic view of an assembly of a weighted tow line and a thermocouple.

A weighted tow line 510 may be provided for installing each thermocouple 500 into the tubular reactor 1. The weighted tow line 510 may comprise a weight 511 and a tow line 512 that trails from the weight 511 as shown in FIG. 4.

As shown in FIGS. 5 and 6, the weight 511 may comprise an elongate body 515 that may be straight. The elongate body 515 may have a tapered tip 516 at a distal end. The elongate body 515 may comprise a tubular section 513 at a proximal end opposite the tapered tip 516. Other than for the tubular section 513, the weight 511 may be solid. The weight 511 may be rigid and may be formed from, for example, stainless steel.

The weight 511 may have a length greater than a length of one catalyst carrier 10, optionally greater than a length of two or three catalyst carriers 10. The weight 511 may have a length of greater than 200 mm, optionally greater than 300 mm, optionally greater than 400 mm. The tapered tip 516 may have a length of about 50 mm.

As shown in FIG. 6, the tubular section 513 may define a bore 514 for receiving an end of the tow line 512. The tow line 512 may be attached to the weight 511 by, for example, crimping or flattening of the tubular section 513 to grip the tow line 512. Other attachment means may be used; for example, an adhesive, soldering, or a screwed or plugged attachment.

As shown in FIG. 7, the thermocouple 500 may also comprise a tip portion 520 configured for attachment to the tow line 512. The tip portion 520 may extend distally from a distal end of the one or more thermocouple assemblies 501. The tip portion 520 may comprise a tubular section 521 that may define a bore 522 for receiving an end of the tow line 512. The tow line 512 may be attached to the thermocouple by, for example, crimping or flattening of the tubular section 521 to grip the tow line 512. Other attachment means may be used; for example, an adhesive, soldering or a screwed or plugged attachment.

The tip portion 520 may have a tip 523 that is tapered.

The tip portion 520 may have a length greater than a length of one catalyst carrier 10, optionally greater than a length of two or three catalyst carriers 10. The tapered tip 523 may have a length of about 50 mm.

The tow line 512 may be formed from a suitable material. It may, for example, be a steel wire. The wire may have a thickness of, for example, about 1.2 mm.

In use, the thermocouple 500 may be installed in a reactor tube of the tubular reactor 1 by first inserting the weight 511 of the weighted tow line 510 into a top of the reactor tube 8 and into the inner channel of an uppermost catalyst carrier 10. The weighted tow line 510 may be lowered, dropped or otherwise fed under gravity through the inner channel of the uppermost catalyst carrier 10 and thereafter through the inner channels of each of the remaining catalyst carriers 10 of the stack until the weighted tow line 510 emerges from a bottom of the reactor tube 8.

At this point, if desired, the weight 511 may be detached from the tow line 512, for example by cutting it off.

The thermocouple 500 is attached to a trailing end of the tow line 512. The attachment may be carried out once the tow line 512 has been fed through the reactor tube 8 or previously to this.

Next, the thermocouple 500 is engaged into the top of the reactor tube 8 within the inner channel of the uppermost catalyst carrier 10 of the stack; and the tow line 512 is pulled from below the reactor tube 8 to pull the thermocouple 500 down the reactor tube 8 through the inner channels of the stack of catalyst carriers 10.

The tow line 512 may be pulled manually or mechanically and preferably may be wound by a winding device in order to pull it down the reactor tube 8.

Once the thermocouple 500 is in the desired position, the tow line 512 may be detached from the thermocouple 500, for example by cutting it off.

During installation the weighted tow line 510 may pass through a drain hole communicating with the inner channel of each of the catalyst carriers 10. In some examples the drain holes each have an inner diameter of 3.0 to 10.0 mm; optionally 5.0 to 6.5 mm; optionally 5.2 to 5.8 mm. The outer sheath 502 may have an outer diameter of 1.0 to 6.4 mm.

The drain hole may be at a bottom of the catalyst carrier 10 and may be sized to accommodate passage of the weight 511, tow-line 512 and the thermocouple 500.

The drain hole may be located on a central axis of the inner channel of each catalyst carrier 10.

The inner channel of each catalyst carrier 10 may comprise a funnel portion for guiding the weight 511 and the thermocouple 500 towards the drain hole.

The tubular reactor 1 may be provided with multiple thermocouples 500. Each thermocouple 500 may be installed in a different reactor tube 8. Sets of two or more thermocouples 500 may be used to monitor temperatures in different zones of the tubular reactor 1. For example, as shown in FIGS. 2 and 3, three thermocouples **500*a*, 500*b* and 500*c* may be installed in three different reactor tubes 8. Thermocouple 500*a* may be used to monitor the temperatures in a bottom portion of the tubular reactor 1, for example, a bottom third of the tubular reactor 1. Thermocouple 500***b* may be used to monitor the temperatures in a middle portion of the tubular reactor 1, for example, a middle third of the tubular reactor 1. Thermocouple 500*c* may be used to monitor the temperatures in an upper portion of the tubular reactor 1, for example, an upper third of the tubular reactor 1. The catalyst carrier positions down the tube that are monitored by the thermocouples 500*a-c* may overlap.

Beneficially, using sets of thermocouples 500 to monitor the full length of the tubular reactor 1 can reduce the outer diameter of each individual thermocouple 500 (by limiting the number of thermocouple assemblies 501 within each outer sheath 502). This may improve the loading through the inner channel and drain hole in each catalyst carrier 10.

An example of a catalyst carrier 10 according to the present disclosure that may be used with the thermocouples 500 is shown, by way of example, in FIGS. 8 to 10. However, it will be understood that according to the present disclosure the catalyst carriers 10 may take various forms. For example, as well as the examples described herein the catalyst carriers 10 may take other forms including but not limited to those disclosed in WO2011/048361, WO2012/136971 and WO2016/050520, the contents of which are herein incorporated by reference in their entirety.

The catalyst carrier 10 may generally comprise a container that is sized such that it is of a smaller dimension than the internal dimension of the reactor tube 8 into which it is to be placed in use. Typically, a seal will be provided that is sized such that it interacts with the inner wall of the reactor tube 8 when the catalyst carrier 10 is in position within the reactor tube 8. Parameters such as carrier length and diameter may be selected to accommodate different reactions and configurations of reactor tube 8.

As shown in FIGS. 8 to 10, the catalyst carrier 10 may comprise a container 100 for holding catalyst in use. The container 100 may generally have a bottom surface 101 that closes a lower end of the container 100 and a top surface 102 at an upper end of the container 100. A carrier outer wall 103 may extend from the bottom surface 101 to the top surface 102. A seal 104 may extend from the container 100 by a distance which extends beyond the carrier outer wall 103. The carrier outer wall 103 may have apertures 105 located below the seal 104.

As shown in FIG. 8, in at least some embodiments the catalyst carrier 10 may more particularly comprise an annular container 110 for holding catalyst in use. The annular container 110 may comprise a perforated inner container wall 111 that defines an inner channel 112 and a perforated outer container wall 113 that may be concentrically arranged about the perforated inner container wall 111. An annular top surface 114 may close an upper end of the annular container 110 and an annular bottom surface 115 may close a lower end of the annular container 110. A lower end of the inner channel 112 may be closed off by a channel end surface 116 except for one or more drain apertures (not shown) that may be provided in the lower end of the inner channel 112. The channel end surface 116 may be formed integrally or separately to the inner container wall 111.

As shown in the exploded view of FIG. 9, the catalyst carrier 10 may be formed from a number of individual components that may be assembled together by any suitable means, including for example, welding. In some embodiments such components may include a perforated inner tube 120, a perforated intermediate tube 121, an outer tube 122, a bottom cap 123, an annular top ring 124, a top cap 125 and an annular seal ring 126.

The catalyst carrier 10 may be formed of any suitable material. Such material will generally be selected to withstand the operating conditions of the reactor. Generally, the catalyst carrier will be fabricated from carbon steel, aluminium, stainless steel, other alloys or any material able to withstand the reaction conditions.

Suitable thicknesses for the components will be of the order of about 0.1 mm to about 1.0 mm, preferably of the order of about 0.3 mm to about 1.0 mm.

The perforated inner tube 120 may comprise the perforated inner container wall 111. The perforated intermediate tube 121 may comprise the perforated outer container wall 113. The outer tube 122 may comprise the carrier outer wall 103 and define the apertures 105. The bottom cap 123 may comprise the bottom surface 101 and or the annular bottom surface 115. The bottom cap 123 may also extend across the perforated inner tube 120 to comprise the channel end surface 116. The annular top ring 124 and the top cap 125 may comprise the annular top surface 114 and may comprise at least part of the top surface 102. The annular seal ring 126 may comprise the seal 104.

The size of the perforations in the perforated inner tube 120 and the perforated intermediate tube 121 will be selected such as to allow uniform flow of reactant(s) and product(s) through the catalyst while maintaining the catalyst within the annular container 110. It will therefore be understood that their size will depend on the size of the catalyst particles being used. In an alternative arrangement the perforations may be sized such that they are larger but have a filter mesh covering the perforations to ensure catalyst is maintained within the annular container 110.

It will be understood that the perforations may be of any suitable configuration. Indeed, where a wall or tube is described as perforated, all that is required is that there is means to allow the reactant(s) and product(s) to pass through the walls or tubes.

The bottom surface 101, for example the bottom cap 123, may be shaped to engage with an upper end of another catalyst carrier 10. Advantageously, the engagement of adjacent catalyst carriers 10 may promote correct alignment of the catalyst carriers 10. In particular it may help to ensure that the longitudinal axes of the catalyst carriers 10 are substantially coincident which may beneficially ease the passage of the weighted tow line 510 and/or thermocouple 500 through the inner channels 112 and drain holes of the catalyst carriers 10. For example, the bottom surface 101 may comprise an annular recess 130 around the perforated inner tube 120. The top cap 125 may be shaped to engage in the annular recess 130 of another catalyst carrier 10. For example, the top cap 125 may comprise an annular ring 131 that upstands from an annular plug body 132. The annular ring 131 may be shaped and sized to be received in the annular recess 130.

The bottom surface 101, for example the bottom cap 123 and or channel end surface 116 may include one or more drain holes.

The annular top ring 124 may be shaped and sized to engage in an upper end of the outer tube 122. The annular plug body 132 of the top cap 125 may have an outer diameter configured to engage with a central aperture of the annular top ring 124. Engagement of the top cap 125 with the annular top ring 124 may function to sandwich and retain the annular seal ring 126 in position.

The top cap 125 may comprise a central inlet 134 in the annular plug body 132 for enabling entry of liquids and gases into the upper end of the inner channel 112. The annular ring 131 may comprise lateral apertures 133 than enable liquids and gases to reach the central inlet 134.

The carrier outer wall 103 may be smooth or it may be shaped. Suitable shapes include pleats, corrugations, and the like.

The apertures 105 in the carrier outer wall 103 may be of any configuration. In some embodiments, the apertures 105 may be holes or slots.

The seal 104 may be formed in any suitable manner. However, it will generally be sufficiently compressible to accommodate the smallest diameter of the reactor tube 8. The seal 104 will generally be a flexible, sliding seal. In some embodiments the seal 104 may comprise a deformable flange 140 extending from the carrier outer wall 103 or the top surface 102 of the catalyst carrier 10. The flange 140 may be sized to be larger than the internal diameter of the reactor tube 8 such that as the catalyst carrier 10 is inserted into the reactor tube 8 it is deformed to fit inside and interact with the reactor tube 8.

In the illustrated example of FIG. 8, the deformable flange 140 comprises an outer portion of the annular seal ring 126. An inner portion 141 of the annular seal ring 126 may define a clamping surface that is sandwiched and retained between the top cap 125 and the annular top ring 124. The deformable flange 140 may be angled relative to the inner portion 141. The deformable flange 140 may be angled towards the upper end of the catalyst carrier 10.

The carrier outer wall 103 may continue above the seal 104. Thus the seal 104 may be located at the top of the catalyst carrier 10, optionally as part of the top surface 102, or it may be located at a suitable point on the carrier outer wall 103 provided that it is located above the apertures 105 in the carrier outer wall 103.

The invention claimed is:

1. A method of installing a thermocouple in a reactor tube of a tubular reactor, the method comprising the steps of:

i) providing a stack of catalyst carriers within the reactor tube of the tubular reactor, each catalyst carrier comprising an inner channel that extends from a top to a bottom of the catalyst carrier;

ii) providing a weighted tow line comprising a weight and a tow line that trails from the weight;

iii) inserting the weight into a top of the reactor tube and into the inner channel of an uppermost catalyst carrier of the stack;

iv) lowering the weighted tow line under gravity through the inner channel of the uppermost catalyst carrier and thereafter through the inner channels of each of the remaining catalyst carriers of the stack until the weighted tow line emerges from a bottom of the reactor tube;

v) attaching a thermocouple to a trailing end of the tow line;

vi) engaging the thermocouple into the top of the reactor tube within the inner channel of the uppermost catalyst carrier of the stack; and vii) pulling on the tow line from below the reactor tube to pull the thermocouple down the reactor tube through the inner channels of the stack of catalyst carriers into a desired installation position of the thermocouple.

2. The method of claim 1, wherein in step iv) the weighted tow line passes through a drain hole of each of the catalyst carriers, optionally wherein the drain holes of the catalyst carriers are sized to simultaneously function as a conduit for the thermocouple and a drain for the stack of catalyst carriers.

3. The method of claim 1, wherein the weight is configured to have a length greater than a length of one catalyst carrier; and in step iii) the weight is inserted into the inner channel of the uppermost catalyst carrier.

4. The method of claim 1, wherein the thermocouple is configured to have a tip portion having a length greater than a length of one catalyst carrier; and in step vi) the tip portion of the thermocouple is fed into the inner channel of the uppermost catalyst carrier.

5. The method of claim 4, wherein the tip portion comprises a tapered tip and a straight section.

6. The method of claim 4, wherein the thermocouple is attached to the trailing end of the tow line by joining the trailing end to the tip portion of the thermocouple, optionally wherein the tip portion comprises a tubular part and the trailing end of the tow line is attached into the tubular part.

7. The method of claim 1, wherein in step v) the thermocouple is attached to the trailing end of the tow line before the weighted tow line is inserted into the reactor tube or after the weighted tow line emerges from the bottom of the reactor tube.

8. The method of claim 1, wherein after the weighted tow line emerges from the bottom of the reactor tube the weight is detached from the tow line, or wherein after the thermocouple reaches its desired installation position the tow line is detached from the thermocouple.

* * * * *